(12) United States Patent
Eusterbrock

(10) Patent No.: US 9,933,793 B1
(45) Date of Patent: Apr. 3, 2018

(54) AIR PRESSURE REGULATOR

(71) Applicant: Brock Rescue Equipment LLC, Cle Elum, WA (US)

(72) Inventor: Bryan Eusterbrock, Cle Elum, WA (US)

(73) Assignee: Brock Rescue Equipment and Training, LLC, Kintnersville, PA (US)

( * ) Notice: Subject to any disclaimer, the term of this patent is extended or adjusted under 35 U.S.C. 154(b) by 0 days.

(21) Appl. No.: 14/788,736

(22) Filed: Jun. 30, 2015

Related U.S. Application Data

(60) Provisional application No. 62/019,277, filed on Jun. 30, 2014.

(51) Int. Cl.
*F16K 31/12* (2006.01)
*G05D 16/04* (2006.01)

(52) U.S. Cl.
CPC ........ *G05D 16/04* (2013.01); *Y10T 137/7795* (2015.04)

(58) Field of Classification Search
CPC ......... Y10T 137/7795; Y10T 137/7818; Y10T 137/7819
See application file for complete search history.

(56) References Cited

U.S. PATENT DOCUMENTS

| 2,195,728 | A | * | 4/1940 | Jones | ............... | G05D 16/0602 137/454.5 |
| 2,565,560 | A | * | 8/1951 | Jacobsson | .......... | G05D 16/0602 137/12 |
| 2,618,908 | A | * | 11/1952 | Salter | .................... | G05D 16/10 137/315.04 |
| 2,662,348 | A | * | 12/1953 | Jacobsson | .......... | G05D 16/0602 137/505.11 |
| 2,770,252 | A | * | 11/1956 | Bass, Sr. | ............ | G05D 16/0602 137/505.12 |
| 6,722,388 | B1 | * | 4/2004 | McAden | ............... | F16K 15/066 123/506 |
| 2008/0202604 | A1 | * | 8/2008 | Dalton | .................... | F16K 1/385 137/505.35 |

\* cited by examiner

*Primary Examiner* — R. K. Arundale
(74) *Attorney, Agent, or Firm* — FSP LLC

(57) ABSTRACT

An air pressure regulator includes an air input stage, an air output stage, and a transfer stage. The air input stage, air output stage, and transfer stage arranged substantially in-line, end to end along a longitudinal axis. The air input stage is attached to the transfer stage with first fasteners that simultaneously engage with the transfer stage and pressure fit a first pressure step-down piston against an input stage backpressure assembly, and the air output stage is attached to the transfer stage with second fasteners that simultaneously engage with the transfer stage and pressure fit the second pressure step-down piston against an output stage backpressure assembly.

10 Claims, 7 Drawing Sheets

AIR PRESSURE REGULATOR

CROSS-REFERENCE TO RELATED APPLICATIONS

This application claims priority and benefit under 35 U.S.C. 119 to U.S. application Ser. No. 62/019,277, filed on Jun. 30, 2014, and incorporated herein by reference in its entirety.

BACKGROUND

Workers often have to carry air tools to remote locations. Many of these locations are best accessed on foot, rendering it inconvenient to transport air compressors to power the air tools at the work site. For example, air tools used by fire and rescue personnel are often essential to saving lives and property, and often operate on air pressures in the range of 10 psi to 250 psi ("low" pressure). The air supplies for these tools are often portable air tanks under extremely high pressure, for example 6000 psi ("high" pressure). Conventional torque-style air regulators can step down these high pressures to low pressure working range for the tool, but at the cost of wear and tear on internal springs. This can cause the regulator to fail on the job, rendering the air tools all but useless.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Embodiments of an air pressure regulator are described that include an air input stage, an air output stage, and a transfer stage. The air input stage, air output stage, and transfer stage are arranged end to end along a longitudinal axis, substantially in line with one another. The air input stage is attached to the transfer stage with first fasteners that simultaneously engage with the transfer stage and pressure fit the first pressure step-down piston against an input stage backpressure assembly. The air output stage is attached to the transfer stage with second fasteners that simultaneously engage with the transfer stage and pressure fit the second pressure step-down piston against an output stage backpressure assembly.

In some embodiments, the air pressure regulator may include a first pressure step-down piston and a second pressure step-down piston. The first fasteners may include bolts running a length of the air input stage, and the second fasteners may include bolts running a length of the air output stage. The input stage backpressure assembly may include a spring-loaded plunger, and the output stage backpressure assembly may likewise include a spring-loaded plunger.

Drawings

Figure 1:
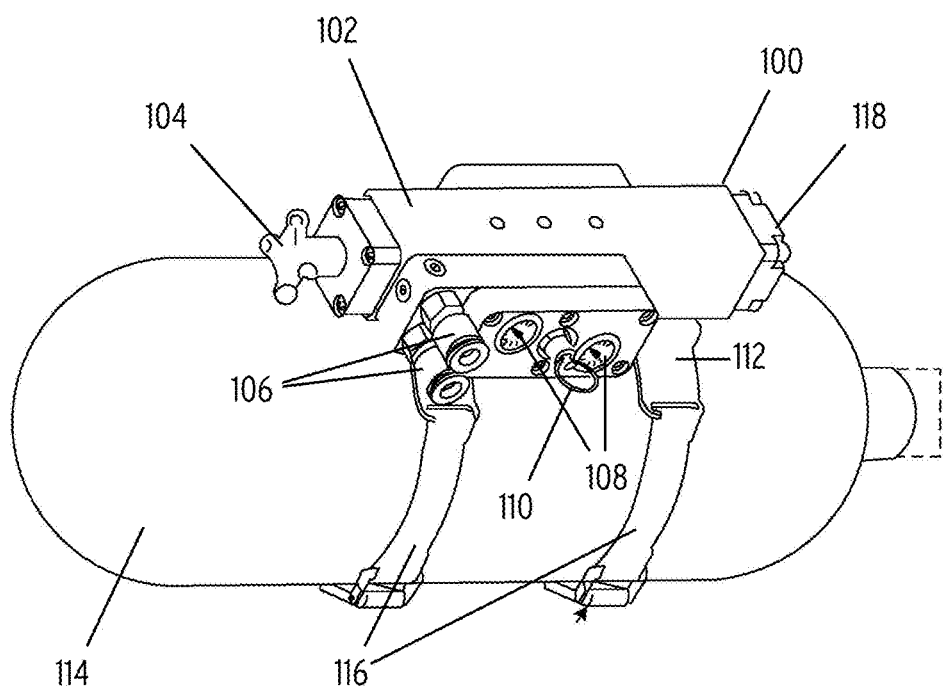
FIG. 1 illustrates an embodiment of an air pressure regulator 100.

FIG. 1 illustrates an embodiment of an air pressure regulator 100. The air pressure regulator 100 comprises a regulator body 102, an output air pressure control 104, a high pressure end 118, air outlets 106, pressure gauges 108, a manual pressure release 110, and one or more strap mount 112 for mounting the air pressure regulator 100 to an air tank 114 using straps 116.

The air pressure regulator 100 comprises a sleek, modular form factor where a high pressure input stage, a low pressure output stage, and a transfer stage (e.g., refer to FIG. 5) are arranged end to end longitudinally, such that they fit within a single rectangular or circular regulator body 102. In other words, the input stage, output stage, and transfer stage are assembled "in-line" with one another.

Figure 2:
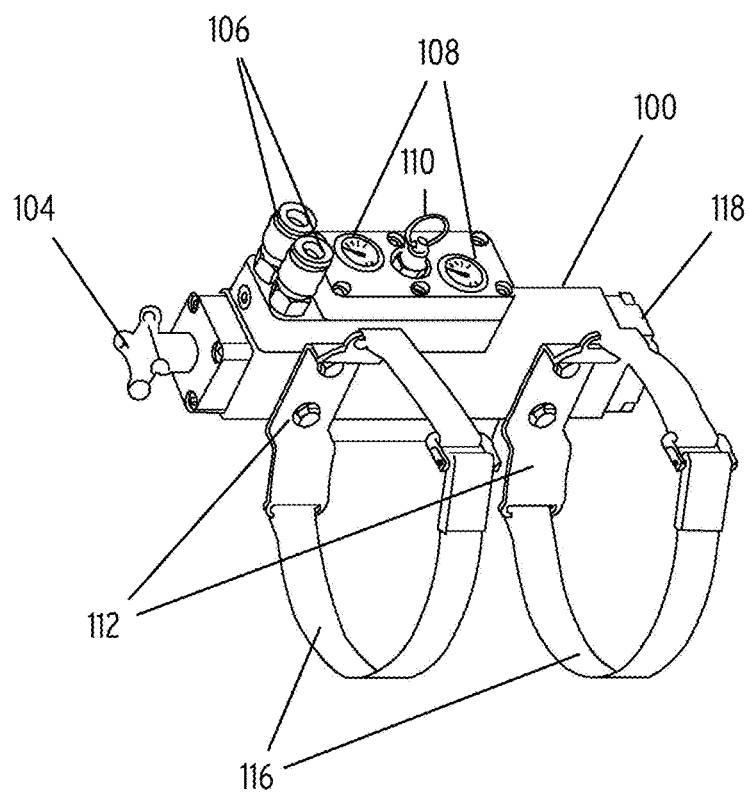
FIG. 2 illustrates an embodiment of an air pressure regulator 100.

FIG. 2 illustrates an embodiment of an air pressure regulator 100.

Figure 3:
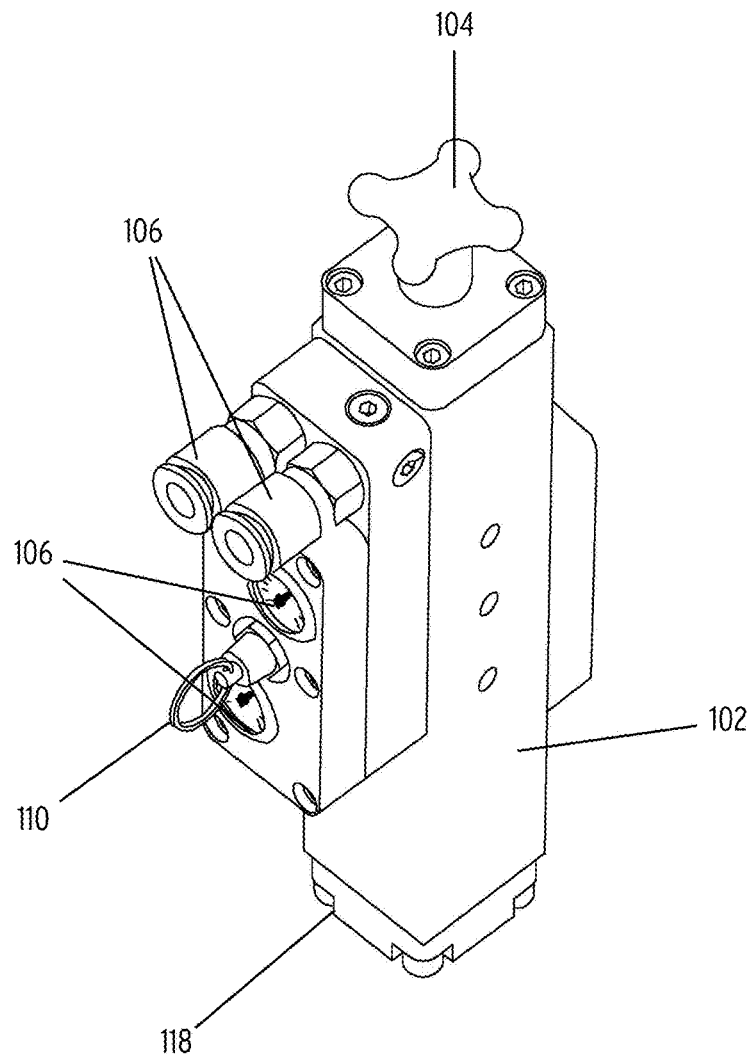
FIG. 3 illustrates an embodiment of an air pressure regulator 100.

FIG. 3 illustrates an embodiment of an air pressure regulator 100.

Figure 4:
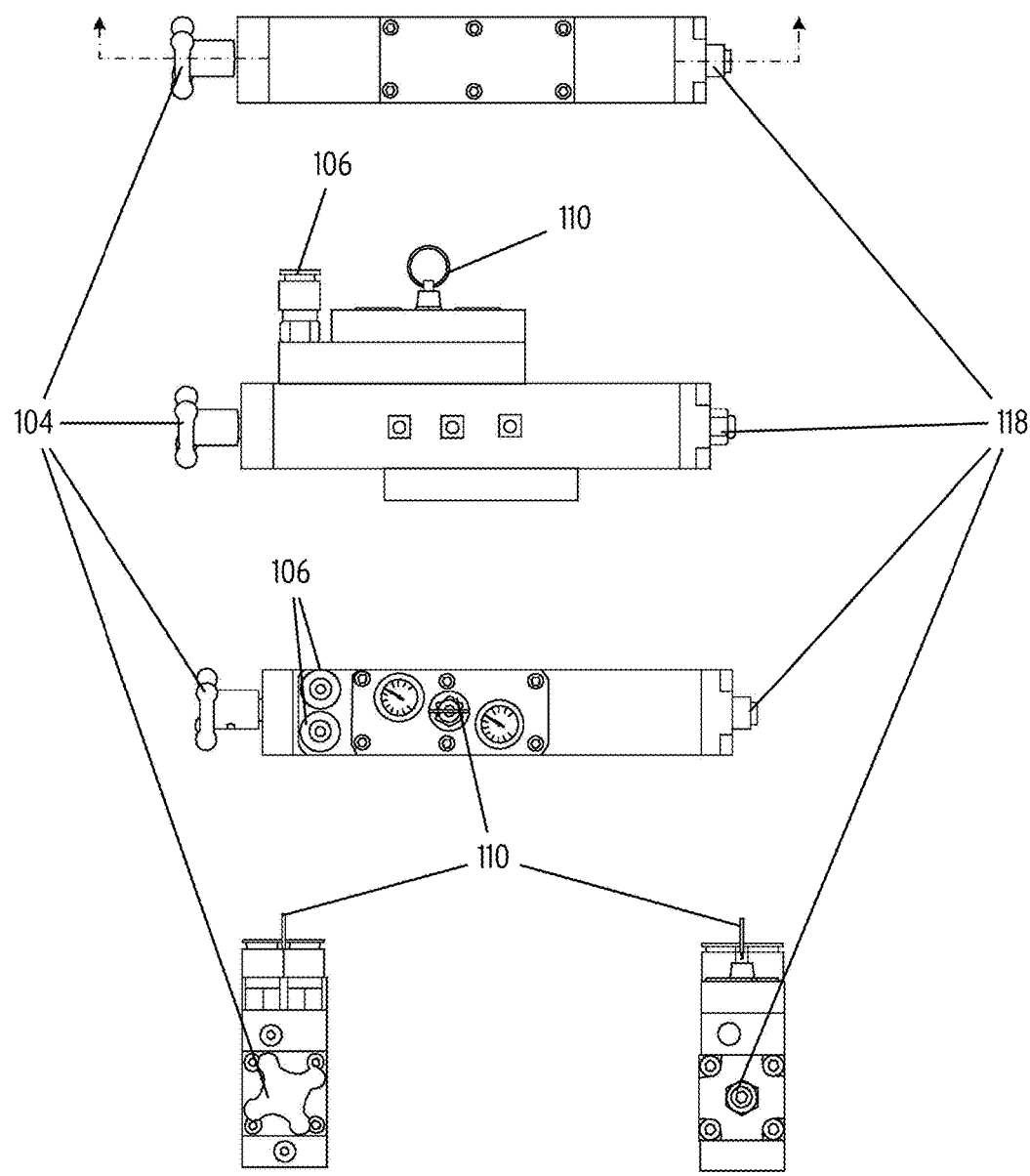
FIG. 4 illustrates an embodiment of an air pressure regulator 100.

FIG. 4 illustrates an embodiment of an air pressure regulator 100.

Figure 5:
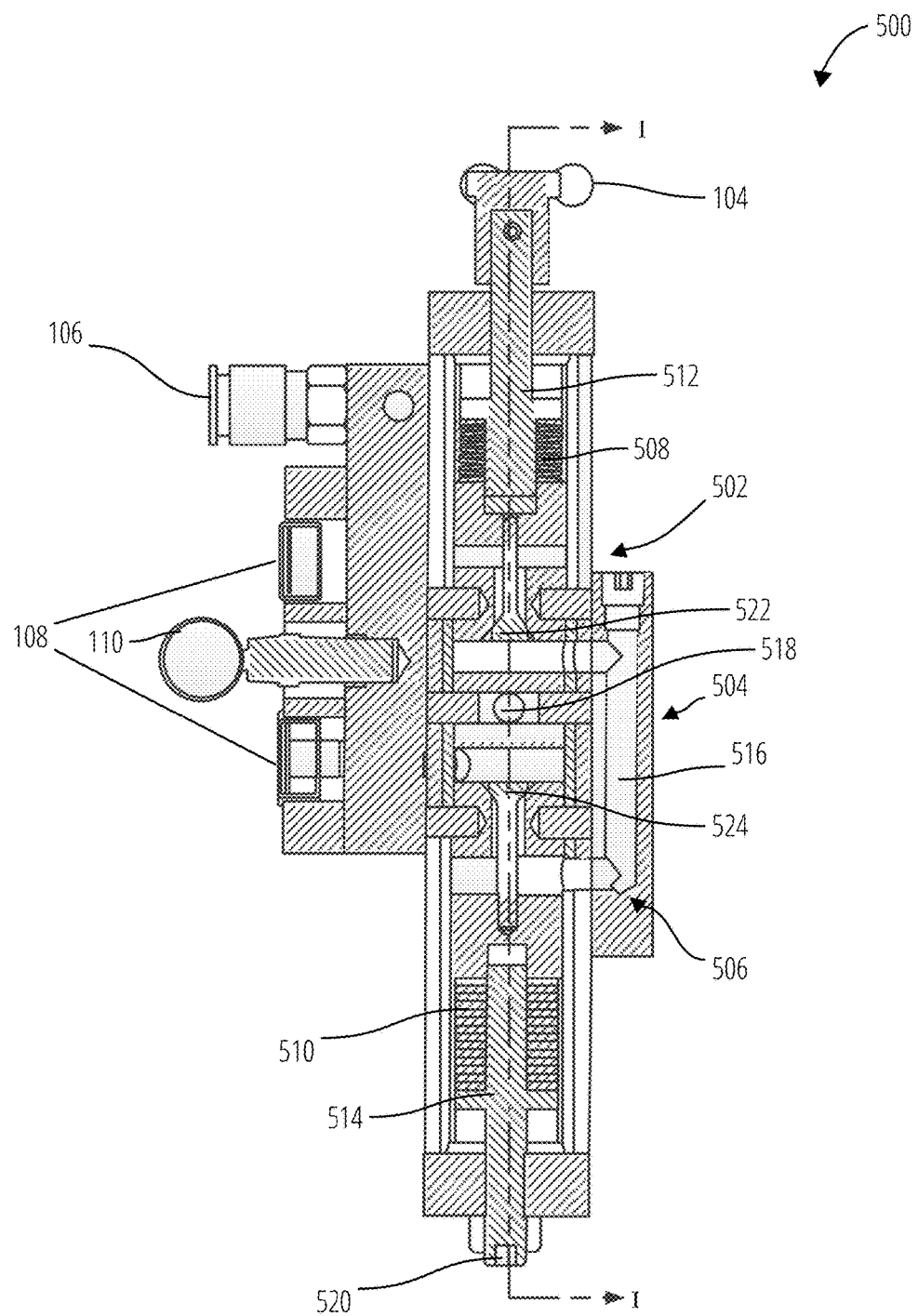
FIG. 5 illustrates a cut away view of an air pressure regulator 100.

FIG. 5 illustrates a cut away view of an air pressure regulator embodiment 500. The air pressure regulator 500 comprises a high pressure input stage 506 longitudinally aligned with a low pressure output stage 502. The high pressure input stage 506 and low pressure output stage 502 are coupled via a pressure transfer stage 504 that is interposed between the high pressure input stage 506 and the low pressure output stage 502.

The air outlets 106 are coupled to the low pressure output stage 504 and the pressure gauges 108 are one each coupled to the high pressure input stage 508 and the low pressure output stage 504 to provide pressure readings for each stage.

In overview, high pressure air may enter the air pressure regulator 500 via a high pressure inlet 518, where the high pressure air engages a first step-down piston 514. The first step-down piston 514 comprises air channels that are pressurized by the input stage spring 510 to a degree determined by a pressure setting screw 520. The backpressure produced on the air channels of the first step-down piston 514 reduces the air pressure in the pressure transfer channel 516. For example, the air pressure in the pressure transfer channel 516 may be reduced from 6000 psi to around 1000 psi in some embodiments.

The air in the pressure transfer channel 516 engages a second step-down piston 512 in the low pressure output stage 502. The second step-down piston 512 comprises air channels pressurized by the output stage spring 508 as set by the output air pressure control 104. The backpressure produced on the air channels of the output stage spring 508 reduces pressure to the air outlets 106. For example, the air pressure at the air outlets 106 may be reduced to between 10 and 250 psi.

The air pressure regulator 100 may be assembled using tubular (e.g., rectangular or circular stock) housings to contain the components of the high pressure input stage 506 and the low pressure output stage 502. Each of the high pressure input stage 506 and the low pressure output stage 502 may be separately attached and detached from the pressure transfer stage 504 using, for example, a set of all-thread bolts the extend the length of each of the low pressure output stage 502 and the high p6ressure input stage 506 and engage with threads of the pressure transfer stage 504. Tightening these bolts may retain the first step-down piston 514 and the second step-down piston 512 in their respective housings and may further act to pressure fit the first step-down piston 514 against the input stage plunger 524 and the second step-down piston 512 against the output stage plunger 522, respectively.

Figure 6:
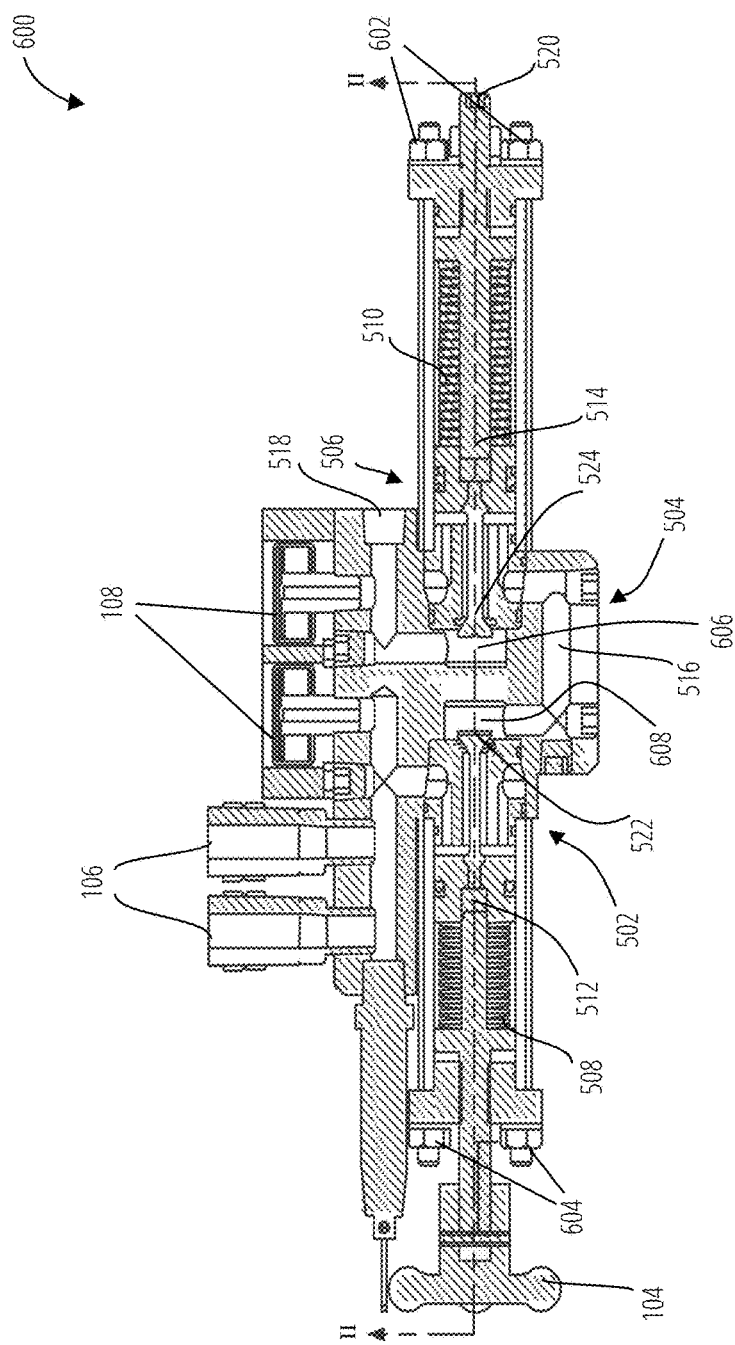
FIG. 6 illustrates an embodiment of an air pressure regulator 600.

FIG. 6 illustrates an embodiment of an air pressure regulator 600. A legend for exemplary commercial components of the air pressure regulator 600 is provided in FIG. 7.

The air pressure regulator 600 comprises a modular set of three stages: a high pressure input stage 506, a pressure transfer stage 604, and a low pressure output stage 502. The low pressure output stage 502 and the high pressure input stage 506 may be individually attached and removed from the pressure transfer stage 504 using output stage retainer bolts 602 and input stage retainer bolts 604 respectively. The output stage retainer bolts 602 run the length of the low pressure output stage 502 and engage the pressure transfer stage 504. Likewise the input stage retainer bolts 604 run the length of the high pressure input stage 506 to engage the pressure transfer stage 504.

Backpressure created by the input stage spring 510 steps down the pressure in an input stage air gap 608 from the pressure at the high pressure inlet 518. The input stage air gap 606 is formed between the first step-down piston 514 and the input stage plunger 524 from the pressure differential of the backpressure created by the input stage plunger 524 as urged by the input stage spring 510, and the input stage air pressure. Air in the input stage air gap 606 travels through the pressure transfer channel 516 to pressure the second step-down piston 512 against the backpressure caused by the output stage plunger 522 as urged by the output stage spring 508. An output stage air gap 608 is formed by the pressure differential created thereby, between the second step-down piston 512 and the output stage plunger 522. The air pressure in the output stage air gap 608 is transferred to the air outlets 106.

Figure 7:
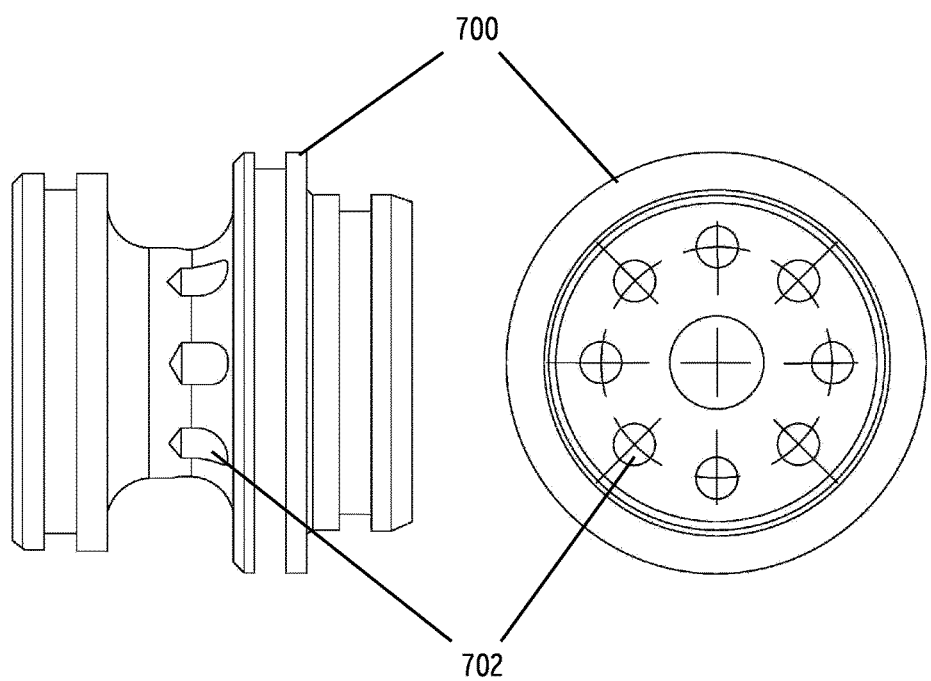
FIG. 7 illustrates an embodiment of a piston 700 that may be utilized in each stage of the air pressure regulator 100.

FIG. 7 illustrates an embodiment of a piston 700 that may be utilized in each stage of the air pressure regulator 100. The piston 700 comprises a plurality of air channels 702 that are back-pressurized by the spring-loaded pistons of each regulator stage.

What is claimed is:

1. An air pressure regulator comprising:
an air input stage;
an air output stage;
a transfer stage;
the air input stage, the air output stage, and the transfer stage arranged end to end along a longitudinal axis;
the air input stage comprising a first pressure step-down piston;
the air output stage comprising a second pressure step-down piston;
wherein the first pressure step-down piston and the second pressure step-down piston each comprise air channels;
the first pressure step down piston collinearly aligned with the second pressure step-down piston along the longitudinal axis;
the air input stage attached to the transfer stage with first fasteners that simultaneously engage with the transfer stage and pressure fit the first pressure step-down piston against an input stage backpressure assembly of the air input stage; and
the air output stage attached to the transfer stage with second fasteners that simultaneously engage with the transfer stage and pressure fit the second pressure step-down piston against an output stage backpressure assembly of the air output stage.

2. The air pressure regulator of claim 1, wherein the first fasteners comprise bolts running a length of the air input stage.

3. The air pressure regulator of claim 1, wherein the second fasteners comprise bolts running a length of the air output stage.

4. The air pressure regulator of claim 1, wherein the input stage backpressure assembly comprises a spring-loaded plunger.

5. The air pressure regulator of claim 1, wherein the output stage backpressure assembly comprises a spring-loaded plunger.

6. An air pressure regulator comprising:
an air input stage;
an air output stage;
a transfer stage;
the air input stage, the air output stage, and the transfer stage arranged end to end along a longitudinal axis;
the air input stage comprising a first pressure step-down piston;
the air output stage comprising a second pressure step-down piston;
the first pressure step down piston collinearly aligned with the second pressure step-down piston along the longitudinal axis;
the air input stage attached to the transfer stage with first fasteners that simultaneously engage with the transfer stage and pressure fit the first pressure step-down piston against an input stage backpressure assembly of the air input stage;
wherein the input stage backpressure assembly comprises a spring-loaded plunger; and
the air output stage attached to the transfer stage with second fasteners that simultaneously engage with the transfer stage and pressure fit the second pressure step-down piston against an output stage backpressure assembly of the air output stage.

7. The air pressure regulator of claim 6, wherein the first pressure step-down piston and the second pressure step-down piston each comprise air channels.

8. The air pressure regulator of claim 6, wherein the output stage backpressure assembly comprises a spring-loaded plunger.

9. An air pressure regulator comprising: an air input stage; an air output stage; a transfer stage; the air input stage, the air output stage, and the transfer stage arranged end to end along a longitudinal axis; the air input stage comprising a first pressure step-down piston; the air output stage comprising a second pressure step-down piston; the first pressure step down piston collinearly aligned with the second pressure step-down piston along the longitudinal axis; the air input stage attached to the transfer stage with first fasteners that simultaneously engage with the transfer stage and pressure fit the first pressure step-down piston against an input stage backpressure assembly of the air input stage; and the air output stage attached to the transfer stage with second fasteners that simultaneously engage with the transfer stage and pressure fit the second pressure step-down piston against an output stage backpressure assembly of the air output stage; and wherein the output stage backpressure assembly comprises a spring-loaded plunger.

10. The air pressure regulator of claim 9, wherein the first pressure step-down piston and the second pressure step-down piston each comprise air channels.

\* \* \* \* \*